United States Patent
Bian et al.

(10) Patent No.: US 11,409,037 B2
(45) Date of Patent: Aug. 9, 2022

(54) ENLARGED WAVEGUIDE FOR PHOTONIC INTEGRATED CIRCUIT WITHOUT IMPACTING INTERCONNECT LAYERS

(71) Applicant: GLOBALFOUNDRIES U.S. Inc., Santa Clara, CA (US)

(72) Inventors: Yusheng Bian, Ballston Lake, NY (US); Ryan W. Sporer, Mechanicville, NY (US); Karen A. Nummy, Newburgh, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 17/082,291

(22) Filed: Oct. 28, 2020

(65) Prior Publication Data

US 2022/0128762 A1 Apr. 28, 2022

(51) Int. Cl.
G02B 6/122 (2006.01)
G02B 6/12 (2006.01)

(52) U.S. Cl.
CPC ......... *G02B 6/1225* (2013.01); *G02B 6/1228* (2013.01); *G02B 2006/1213* (2013.01); *G02B 2006/12061* (2013.01)

(58) Field of Classification Search
CPC .................................................. G02B 6/1228
See application file for complete search history.

(56) References Cited

U.S. PATENT DOCUMENTS

| | | | |
|---|---|---|---|
| 7,010,208 B1 | 3/2006 | Gunn, III et al. | |
| 7,941,023 B2 | 5/2011 | Patel et al. | |
| 8,891,913 B1 * | 11/2014 | Roth | G02B 6/132 385/14 |
| 10,429,582 B1 | 10/2019 | Bian et al. | |
| 10,436,982 B1 * | 10/2019 | Bian | G02B 6/13 |
| 2005/0105853 A1 * | 5/2005 | Liu | G02B 6/1228 385/43 |
| 2014/0264400 A1 * | 9/2014 | Lipson | H01L 33/58 257/88 |

(Continued)

FOREIGN PATENT DOCUMENTS

| | | | | |
|---|---|---|---|---|
| JP | 2012181433 A | * | 9/2012 | ........... G02B 6/1228 |
| WO | WO-2016170859 A1 | * | 10/2016 | ............. G02B 6/122 |

OTHER PUBLICATIONS

"Trench Based Optical Components For Photonics Chips", U.S. Appl. No. 16/597,323, filed Oct. 9, 2019, pp. 1-23.

(Continued)

*Primary Examiner* — Charlie Y Peng
(74) *Attorney, Agent, or Firm* — Anthony Canale; Hoffman Warnick LLC (57) ABSTRACT

Structures and methods implement an enlarged waveguide. The structure may include a semiconductor-on-insulator (SOI) substrate including a semiconductor-on-insulator (SOI) layer over a buried insulator layer over a semiconductor substrate. An inter-level dielectric (ILD) layer is over the SOI substrate. A first waveguide has a lower surface extending at least partially into the buried insulator layer, which allows vertical enlargement of the waveguide, without increasing the thickness of the ILD layer or increasing the length of interconnects to other devices. The enlarged waveguide may include nitride, and can be implemented with other conventional silicon and nitride waveguides.

20 Claims, 7 Drawing Sheets

(56) References Cited

U.S. PATENT DOCUMENTS

2017/0146740 A1    5/2017 Orcutt et al.
2018/0231714 A1*   8/2018 Collins .............. G02B 6/12002

OTHER PUBLICATIONS

Kuanping Shang et al., "Low-loss compact multilayer silicon nitride platform for 3D photonic integrated circuits", Optical Society of America, Aug. 10, 2015, vol. 23, No. 16, pp. 1-9.
Michal Rakowski et al., "45nm CMOS-Silicon Photonics Monlithic Technology (12CLO) for next-generation, low power and high speed optical interconnects", GlobalFoundries, OFC 2020, pp. 1-3.
Giewont et al., "300mm Monolithic Silicon Photonics Foundry Technology", IEEE Journal of Selected Topics in Quantum Electronics, vol. 25, No. 5, Sep./Oct. 2019, pp. 1-12.
Yusheng Bian et al., "Towards low-loss monolithic silicon and nitride photonic building blocks in state-of-the-art 300mm CMOS foundry", GlobalFoundries, pp. 1-2.
Houssein El Dirani et al., "Ultralow-loss tightly confining Si3N4 waveguides and high-Q microresonators", Optics Express, vol. 27, No. 21, Oct. 14, 2019, pp. 1-15.

* cited by examiner

ENLARGED WAVEGUIDE FOR PHOTONIC INTEGRATED CIRCUIT WITHOUT IMPACTING INTERCONNECT LAYERS

BACKGROUND

The present disclosure relates to photonic integrated circuits (PICs), and more specifically, to a structure with an enlarged waveguide extending into a buried insulator layer of a semiconductor-on-insulator (SOI) substrate, which eliminates any impact to interconnect layers of the PIC.

Waveguides are used in PICs to direct optical signals where necessary. Waveguides may be made of, for example, semiconductor material such as silicon, or nitride material such as silicon nitride. The waveguides are made relatively vertically short, e.g., less than 300 nanometers thick, for integration with other integrated circuit devices such as complementary metal-oxide semiconductor (CMOS) transistor devices. Silicon waveguides are typically made in layers with other silicon active regions, and nitride waveguides are made in layers above the silicon layers.

Propagation losses in nitride waveguides can be too high for many applications. One way to reduce the propagation losses is to enlarge the waveguides. However, larger waveguides have not been applied to monolithic PIC platforms because the enlarged sized waveguide impacts the interconnect layers to other active devices. More particularly, vertically enlarged waveguides require increasing the thickness of an inter-level dielectric (ILD) layer(s). Increasing the thickness of the ILD layer(s) detrimentally increases the length of vertical interconnects (contacts) necessary to connect to other devices on the PIC, e.g., middle-of-line interconnects to CMOS devices, or back-end-of-line interconnects above the CMOS device. The vertically longer contacts result in increased contact resistance, negatively impacting overall PIC performance. For similar reasons, optical coupling between silicon waveguides and nitride waveguides in different layers of the PIC has been impossible.

SUMMARY

Aspects of the disclosure are directed to a structure, comprising: a semiconductor-on-insulator (SOI) substrate including a semiconductor-on-insulator (SOI) layer over a buried insulator layer over a semiconductor substrate; an inter-level dielectric (ILD) layer over the SOI substrate; and a first waveguide positioned in the ILD layer in a first region of the SOI substrate, the first waveguide including a lower surface extending at least partially into the buried insulator layer.

Further aspects of the disclosure include a photonic integrated circuit (PIC), the comprising: a semiconductor-on-insulator (SOI) substrate including a semiconductor-on-insulator (SOI) layer over a buried insulator layer over a semiconductor substrate; an inter-level dielectric (ILD) layer over the SOI substrate; a first waveguide positioned in the ILD layer in a first region of the SOI substrate, the first waveguide having a lower surface extending at least partially into the buried insulator layer; and a second waveguide in the ILD layer in the first region of the SOI substrate, the second waveguide including a lower surface above the buried insulator layer, wherein the first and second waveguide are optically side-coupled, and wherein the first waveguide has a larger thickness than the second waveguide.

Still further aspects of the disclosure relate to a method of forming a waveguide structure, the method comprising: forming a first waveguide by: forming a first trench through an inter-level dielectric (ILD) layer in a first region of a semiconductor-on-insulator (SOI) substrate under the ILD layer, the first trench extending into at least an upper portion of a buried insulator layer of the SOI substrate; forming a first nitride layer within the first trench; and planarizing an upper surface of the first nitride layer, wherein the upper surface of the first nitride layer remains within the ILD layer.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, portion, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, waveguides being "optically coupled" indicates that the waveguides are structurally positioned and/or arranged to allow optical signals to be transmitted therebetween. More specifically, "optically side-coupled" or "side-coupled" indicates that the waveguides are structurally positioned and/or arranged laterally (with at least some vertical overlap) to allow optical signals to be transmitted laterally therebetween, i.e., through sides thereof.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure provide structures and methods having an enlarged waveguide, compared to smaller sized silicon or nitride waveguides, e.g., less than approximately 300 nanometers. The structure may include a semiconductor-on-insulator (SOI) substrate including a semiconductor-on-insulator (SOI) layer over a buried insulator layer over a semiconductor substrate. An inter-level dielectric (ILD) layer is over the SOI substrate. A first waveguide is positioned in the ILD layer in a first region of the SOI substrate. In addition, the first waveguide includes a lower surface extending at least partially into the buried insulator layer, which allows vertical enlargement of the waveguide (e.g., to a thickness of approximately 0.5-1.0 micrometers ($\mu m$)), without increasing the thickness of the ILD layer or increasing the length of interconnects to other devices. The enlarged waveguide may include nitride, and can be easily implemented with other conventional silicon and nitride waveguides. The enlarged waveguide improves propagation losses, and allows vertical optical coupling between conventional silicon waveguides (e.g., in silicon layers) and other conventionally sized nitride waveguides in other layers than the silicon waveguides. Since the enlarged waveguide does not also increase the thickness of the ILD layer, no changes that would negatively impact contact resistance are required to middle-of-line interconnects (e.g., to CMOS devices) or back-end-of-line interconnects (e.g., above CMOS devices). The enlarged waveguide also enables silicon-to-nitride waveguide optical side-coupling that was not previously possible, while also maintaining nitride-to-nitride waveguide optical side-coupling. Hence, the waveguide enables monolithic integration of ultra-low-loss, large-size nitride waveguides with silicon waveguides and CMOS device(s), allowing full realization of the benefit of ultra-low-loss nitride devices and photonic integrated circuits. The enlarged waveguide is also less sensitive to fabrication variations than existing nitride waveguides, and can handle higher optical power.

Figure 1:
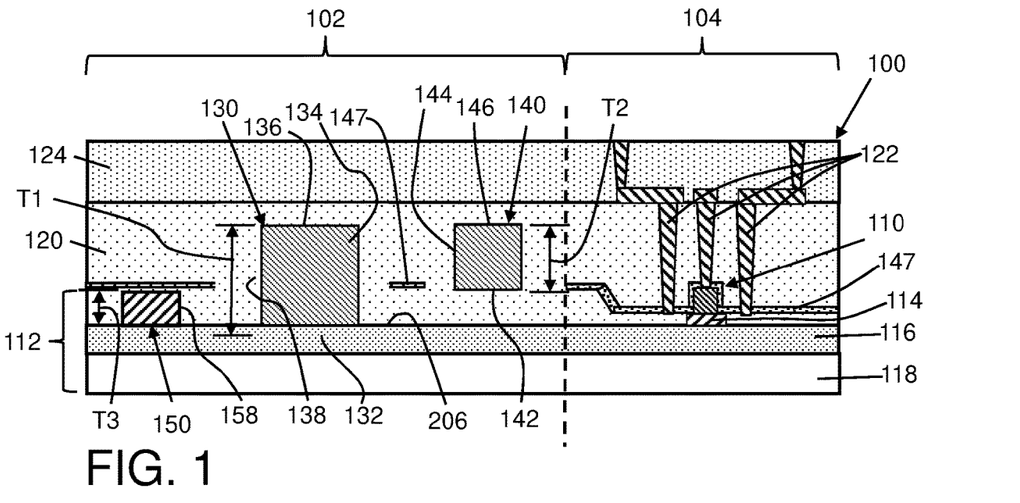
FIG. 1 shows a cross-sectional view of a waveguide structure, according to embodiments of the disclosure.

FIG. 1 shows a cross-sectional view of a structure 100 according to embodiments of the disclosure. Structure 100 includes a first region 102 in which waveguides according to embodiments of the disclosure are provided, and a second region 104 in which a complementary metal-oxide semiconductor (CMOS) device 110 is positioned. Structure 100 may also be referred to herein as a waveguide structure or a photonic integrated circuit (PIC), i.e., an integrated circuit with optical functions.

Structure 100 includes a semiconductor-on-insulator (SOI) substrate 112 including a semiconductor-on-insulator (SOI) layer 114 over a buried insulator layer 116 over a semiconductor substrate 118. Some or all of SOI layer 114 may be omitted in first region 102. SOI layer 114 and semiconductor substrate 118 may include but are not limited to silicon, germanium, silicon germanium, silicon carbide, and those consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Other suitable substrates include II-VI compound semiconductors having a composition $Zn_{A1}Cd_{A2}Se_{B1}Te_{B2}$, where A1, A2, B1, and B2 are relative proportions each greater than or equal to zero and A1+A2+B1+B2=1 (1 being a total mole quantity). Furthermore, a portion or entire semiconductor substrate may be strained. For example, SOI layer 114 may be strained. Buried insulator layer 116 may include any appropriate dielectric material such as but not limited silicon oxide ($SiO_2$).

Structure 100 may also include an inter-level dielectric (ILD) layer 120 over SOI substrate 112. Suitable dielectric materials include but are not limited to: carbon-doped silicon oxide materials; fluorinated silicate glass (FSG); organic polymeric thermoset materials; silicon oxycarbide; SiCOH dielectrics; fluorine doped silicon oxide; spin-on glasses; silsesquioxanes, including hydrogen silsesquioxane (HSQ), methyl silsesquioxane (MSQ) and mixtures or copolymers of HSQ and MSQ; benzocyclobutene (BCB)-based polymer dielectrics, and any silicon-containing low-k dielectric. Examples of spin-on low-k films with SiCOH-type composition using silsesquioxane chemistry include HOSP™ (available from Honeywell), JSR 5109 and 5108 (available from Japan Synthetic Rubber), Zirkon™ (available from Shipley Microelectronics, a division of Rohm and Haas), and porous low-k (ELk) materials (available from Applied Materials). Examples of carbon-doped silicon dioxide materials, or organosilanes, include Black Diamond™ (available from Applied Materials) and Coral™ (available from Lam Research). In one non-limiting example, ILD layer 120 includes one or more variations of silicon oxide ($SiO_2$).

CMOS device 110 may include any now known or later developed integrated circuit structure(s) that would be integrated with photonics, such as but not limited to: transistors, trans-impedance amplifiers (TIA), drivers or passive devices (e.g., a resistor, capacitor or other passive element). CMOS device 110 may be formed using any now known or later developed semiconductor fabrication techniques. CMOS device 110 is in second region 104 of SOI substrate 112. ILD layer 120 is over CMOS device 110 and includes interconnects 122 to CMOS device 110. Interconnects 122 may include any now known or later developed metal wire or contact. Any number of additional ILD layer(s) 124 may also be provided over ILD layer 120 in a known fashion, i.e., providing back-end-of-line (BEOL) interconnect layers.

Structure 100 also includes a first waveguide 130 positioned in ILD layer 120 in first region 102 of SOI substrate 112. First waveguide 130 includes a lower surface 132 extending at least partially into buried insulator layer 116. Hence, first waveguide 130 may extend into upper portion 206 of buried insulator layer 116. In one non-limiting example, first waveguide 130 may extend into buried insulator layer 0.02-0.5 micrometers (μm) for a 2 μm thick buried insulator layer 116. Other dimensions may be possible depending on a desired size of first waveguide 130. In one embodiment, first waveguide 130 may include a nitride material such as silicon nitride ($Si_3N_4$).

Structure 100 may also include a second waveguide 140 in ILD layer 120 in first region 102 of SOI substrate 112. In contrast to first waveguide 130, second waveguide 140 includes a lower surface 142 above buried insulator layer 116. As illustrated, first and second waveguides 130, 140 overlap vertically, allowing sides 134, 144, respectively, thereof to optically side-couple. Second waveguide 140 may include a nitride material such as silicon nitride ($Si_3N_4$). Hence, although not necessary in all instances, second waveguide 140 may include the same material as first waveguide 130.

As shown in FIG. 1, first waveguide 130 and second waveguide 140 have different thicknesses. In the example shown, first waveguide 130 has a larger vertical extent, i.e., thickness T1, than second waveguide 140, i.e., thickness T2. Second waveguide 140 may have a thickness T2 that is similar to conventional nitride waveguides, e.g., less than 300 nanometers (nm). As shown in FIG. 1, first and second waveguides 130, 140 may extend through a nitride cap 147 that would normally separate portions of ILD layer 120, e.g., over trench isolations, etc. Consequently, since second waveguide 140 may extend below nitride cap 147, it also may be made slightly thicker than conventional nitride waveguides, where desired. First waveguide 130 may have a thickness of, in one embodiment, approximately 0.5-1.0 micrometers (μm). First waveguide 130 and second waveguide 140 may have upper surfaces 136, 146, respectively, that are coplanar. That is, they are at the same height within ILD layer 120. The height with ILD layer 120 is such that lengthening of interconnects 122 to, for example, CMOS devices 110, is not necessary. In this manner, enlarged first waveguide 130 can be provided without impacting contact resistance and overall performance of the PIC.

Structure 100 may also optionally include a third waveguide 150 in ILD layer 120 in first region 102 of SOI substrate 112. In contrast to first and second waveguides 130, 140, third waveguide 150 may include a silicon material. Hence, first waveguide 130 and second waveguide 140 may include a different material than third waveguide 150. First and second waveguides 130, 140 may include a nitride material, and third waveguide 150 may include silicon material. As illustrated, due to the increased thickness of first waveguide 130 into buried insulator layer 116, first and third waveguides 130, 150 overlap vertically, allowing sides 138, 158, respectively, thereof to optically side-couple the waveguides. In this manner, optical signals can be optically transmitted in a vertical direction in structure 100, which was previously impossible because nitride waveguides are all above nitride cap 147 and do not overlap silicon waveguide 150. Third waveguide 150 may have a thickness T3 that is similar to conventional silicon waveguides, e.g., less than 300 nm. Third waveguide 150 may be below nitride cap 147.

Figure 2:
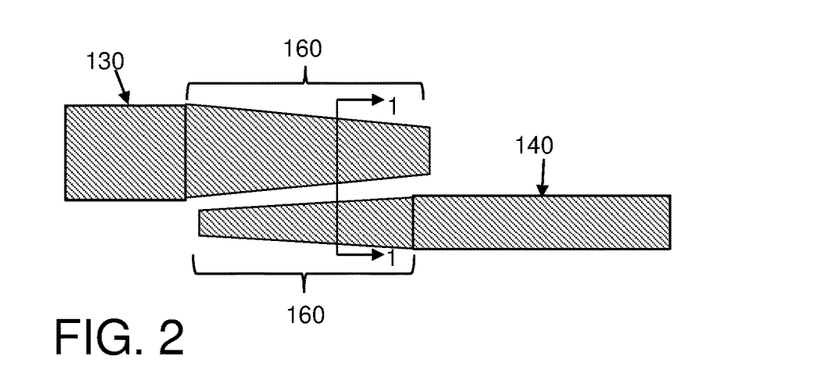
FIG. 2 shows a top down view of an enlarged waveguide and a nitride waveguide, according to embodiments of the disclosure.
Figure 3:
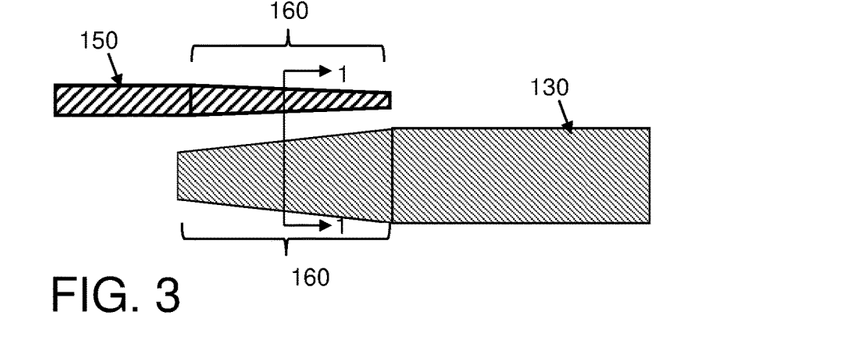
FIG. 3 shows a top down view of an enlarged waveguide and a silicon waveguide, according to embodiments of the disclosure.

FIG. 2 shows a top down view of first and second waveguides 130, 140 (partially) showing the cross-sectional view line for FIG. 1; and FIG. 3 shows a top down view of first and third waveguides 130, 150 (partially) showing the cross-sectional view line for FIG. 1. As shown in FIGS. 2 and 3, at least one of the first, second and third waveguides 130, 140, 150 may include a portion having a laterally tapering dimension. That is, waveguides 130, 140, 150 may include tapered portions 160 that taper into or out of the page of FIG. 1. A rest of waveguides 130, 140, 150 may have parallel sides. Optical signals may move left-to-right or right-to-left in FIGS. 2 and 3. In addition, optical signals can move vertically within first waveguide 130.

While a particular positioning of waveguides 130, 140, 150 has been illustrated in FIGS. 1-3, it is emphasized that the positioning may vary, e.g., with enlarged waveguide 130 in another position, or one or more additional waveguides 130, 140, 150 present. Any number of waveguides 130, 140, 150 may be employed, and each may have different dimensions, if desired.

FIGS. 4-15 show cross-sectional views of forming structure 100, according to various embodiments of the disclosure. Structure 100, including waveguides 130, 140, 150, may be formed in a number of ways. FIGS. 5-11 show an embodiment of a method in which waveguides 130, 140 are formed sequentially, and FIGS. 12-15 show an embodiment of a method in which waveguides 130, 140 are formed, generally speaking, together.

Figure 4:
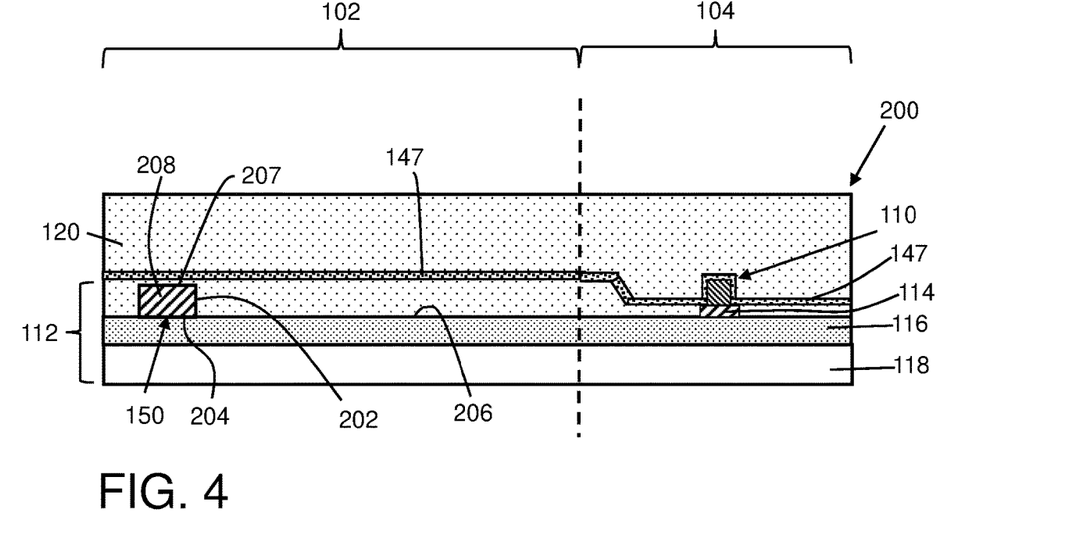
FIG. 4 shows a cross-sectional view of a preliminary structure for methods of forming a waveguide structure, according to embodiments of the disclosure.

FIG. 4 shows a cross-sectional view of a preliminary structure 200. Preliminary structure 200 includes SOI substrate 112 with CMOS 110 formed in second region 104 of SOI substrate 112, as noted herein. CMOS device 110 may be formed partially in SOI layer 114 of SOI substrate 112 in second region 104 of SOI substrate 112, using any now known or later developed techniques. ILD layer 120 is formed over CMOS device 110 and may be part of a middle-of-line (MOL) layer including interconnects 122 (FIG. 1) (formed later) to CMOS device 110.

ILD layer 120 may be formed by deposition. "Depositing" may include any now known or later developed techniques appropriate for the material to be deposited including but are not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metalorganic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation. Here, ILD layer 120 may be formed by CVD, for example.

Third waveguide 150 may be formed, prior to forming first waveguide 130, from SOI layer 114, e.g., by patterning SOI layer 114 to create the waveguide. Alternatively, third waveguide 150 may be formed, prior to forming first waveguide 130, by: forming a trench 202 in ILD layer 120 in first region 102 of SOI substrate 112, forming a silicon layer 208 within trench 202, and planarizing an upper surface 207 of silicon layer 208. As described herein, trenches, including trench 202, may be formed using any now known or later developed opening forming technique such as photolithography and patterning techniques, e.g., depositing a photoresist (not shown) on a layer, exposing the photoresist to light in a specified pattern, etching the photoresist to form a mask, etching the layer (e.g., ILD layer 120) using the mask, and then removing the mask. It is noted that lower surface 204 of trench 202 is above an upper portion 206 of buried insulator layer 116. Consequently, third waveguide 150 does not extend into buried insulator layer 116. Silicon layer 208 may be deposited using any appropriate technique. Here, silicon layer 208 may be formed by ALD, for example.

Etching generally refers to the removal of material from a substrate (or structures formed on the substrate), and is often performed with a mask in place so that material may selectively be removed from certain areas of the substrate, while leaving the material unaffected, in other areas of the substrate. There are generally two categories of etching, (i) wet etch and (ii) dry etch. Wet etch is performed with a solvent (such as an acid) which may be chosen for its ability to selectively dissolve a given material (such as oxide), while, leaving another material (such as polysilicon) relatively intact. This ability to selectively etch given materials is fundamental to many semiconductor fabrication processes. A wet etch will generally etch a homogeneous material (e.g., oxide) isotropically, but a wet etch may also etch single-crystal materials (e.g. silicon wafers) anisotropically. Dry etch may be performed using a plasma. Plasma systems can operate in several modes by adjusting the parameters of the plasma. Ordinary plasma etching produces energetic free radicals, neutrally charged, that react at the surface of the wafer. Since neutral particles attack the wafer from all angles, this process is isotropic. Ion milling, or sputter etching, bombards the wafer with energetic ions of noble gases, which approach the wafer approximately from one direction, and therefore this process is highly anisotropic. Reactive-ion etching (RIE) operates under conditions intermediate between sputter and plasma etching and may be used to produce deep, narrow features, such as trenches 202, 210, etc.

Planarization refers to various processes that make a surface more planar (that is, more flat and/or smooth). Chemical-mechanical-polishing (CMP) is one currently conventional planarization process, which planarizes surfaces with a combination of chemical reactions and mechanical forces. The planarization of third waveguide 150 may be performed with planarization of other structure, e.g., parts of CMOS device 110.

A nitride cap 147 may be formed over waveguide 150, among other structure such as CMOS device 110, using any now known or later developed techniques.

Figure 5:
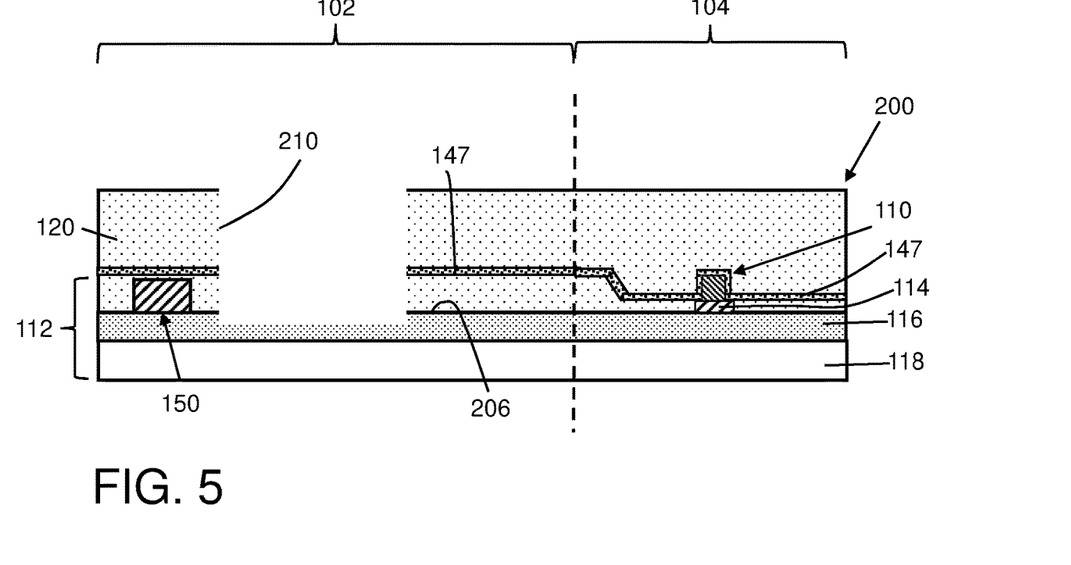
FIG. 5 shows a cross-sectional view of forming a first trench for a first waveguide, according to embodiments of the disclosure.

As noted, first and second waveguides 130, 140 may be formed separately or generally together. FIGS. 5-11 show forming first and second waveguides 130, 140 separately. As shown in FIG. 5, the method of forming waveguide structure 100 includes forming first waveguide 130 (FIG. 1) by: forming a trench 210 through ILD layer 120 in first region 102 of SOI substrate 112 under ILD layer 120. First trench 210 extends at least partially into upper portion 206 of a buried insulator layer 116 of SOI substrate 112. In one non-limiting example, first trench 210 may extend into buried insulator layer 0.02-0.5 micrometers ($\mu$m) for a 2 $\mu$m thick buried insulator layer 116. First trench 210 may also remove nitride cap 147. First trench 210 may be formed using any now known or later developed opening techniques, as described herein. First trench 210 may have any desired dimensions. Notably, where desired, trench 210 may have a portion having a laterally tapered shape to form portion tapered portion 160 (FIG. 2) of waveguide 130.

Figure 6:
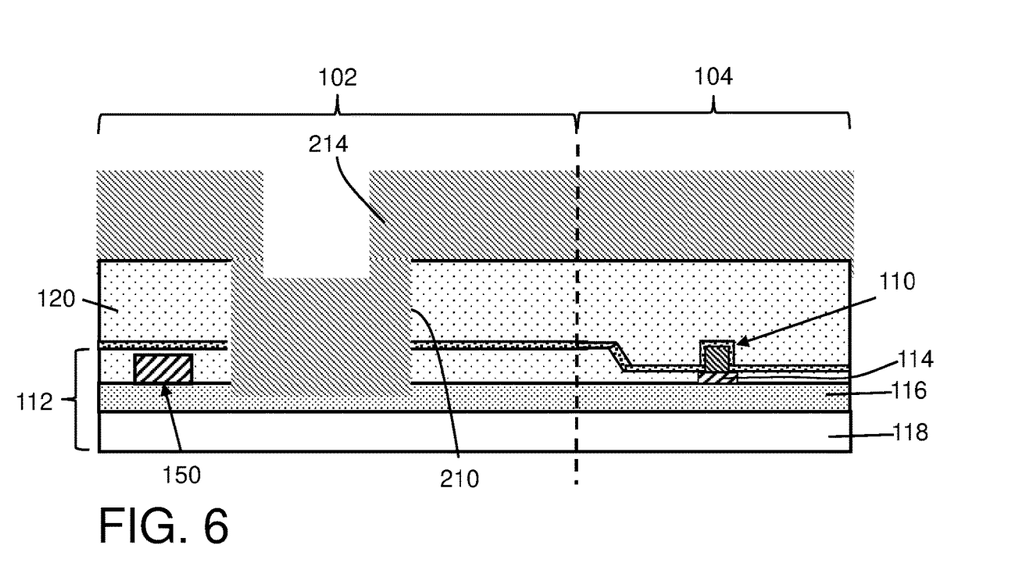
FIG. 6 shows a cross-sectional view of forming a first nitride layer for a first waveguide, according to embodiments of the disclosure.

FIG. 6 shows forming a first nitride layer 214 within first trench 210. Nitride may be deposited using any appropriate technique, and multiple deposition steps may be performed.

Figure 7:
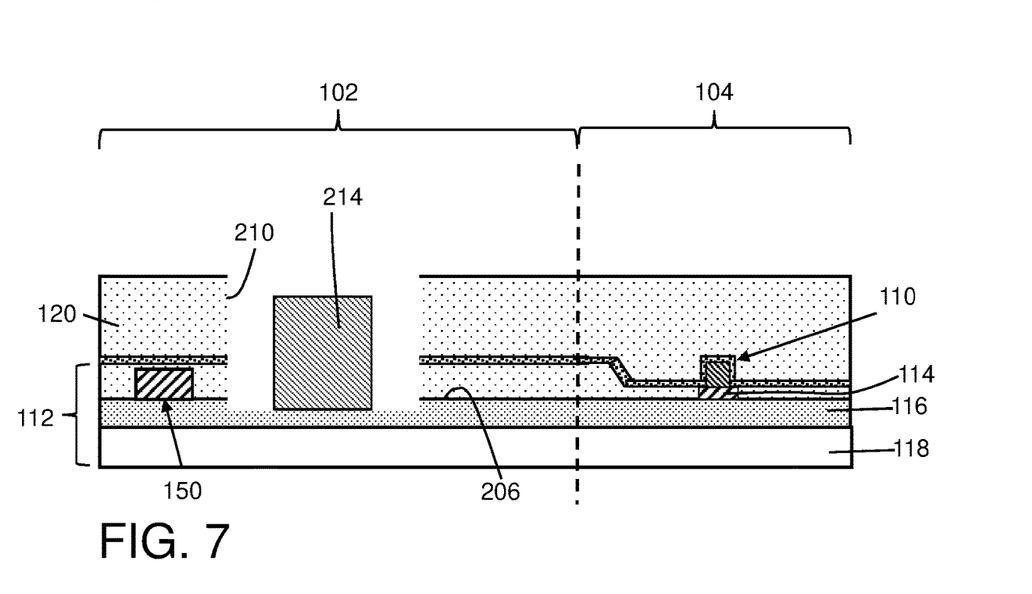
FIG. 7 shows a cross-sectional view of patterning a first nitride layer for a first waveguide, according to embodiments of the disclosure.

FIG. 7 shows an optional lithography and etching of first nitride layer 214, i.e., to shape it to desired dimensions. The etching may include, for example, a RIE.

Figure 8:
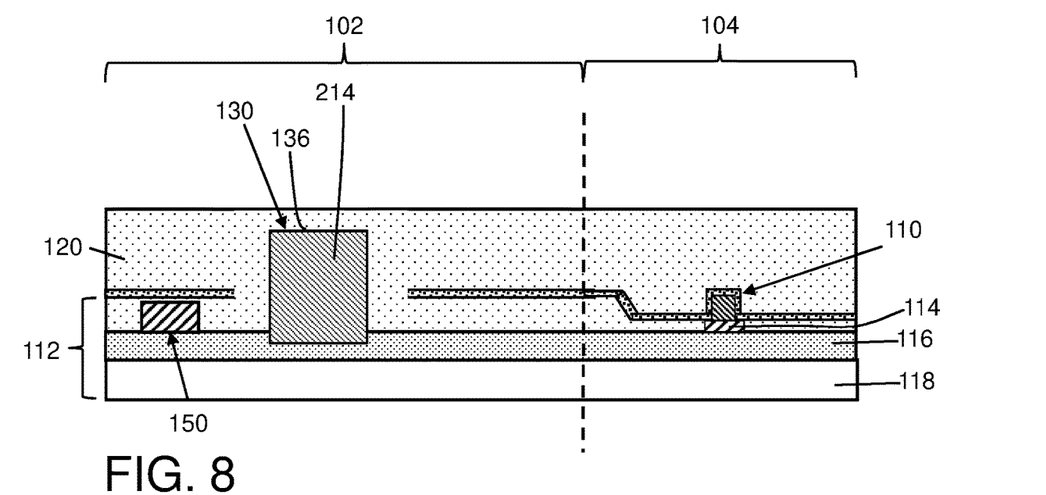
FIG. 8 shows a cross-sectional view of refilling an ILD layer for a first waveguide, according to embodiments of the disclosure.

FIG. 8 shows processing after refilling ILD layer 120, i.e., into trench 210 (FIG. 7). The refilling may include, for example, gap filling about first nitride layer 214, planarizing upper surface 136 of first nitride layer 214 (FIG. 7), and forming a topping layer of ILD layer 120 over first nitride layer 214. Upper surface 136 of first waveguide 130 (first nitride layer 214) remains within ILD layer 120.

Figure 9:
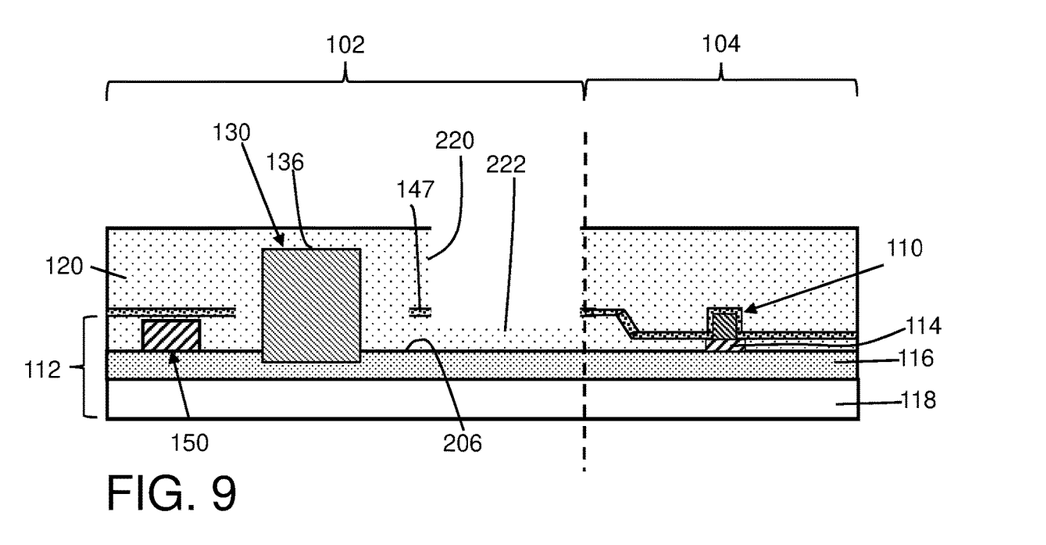
FIG. 9 shows a cross-sectional view of forming a second trench for a second waveguide, according to embodiments of the disclosure.
Figure 10:
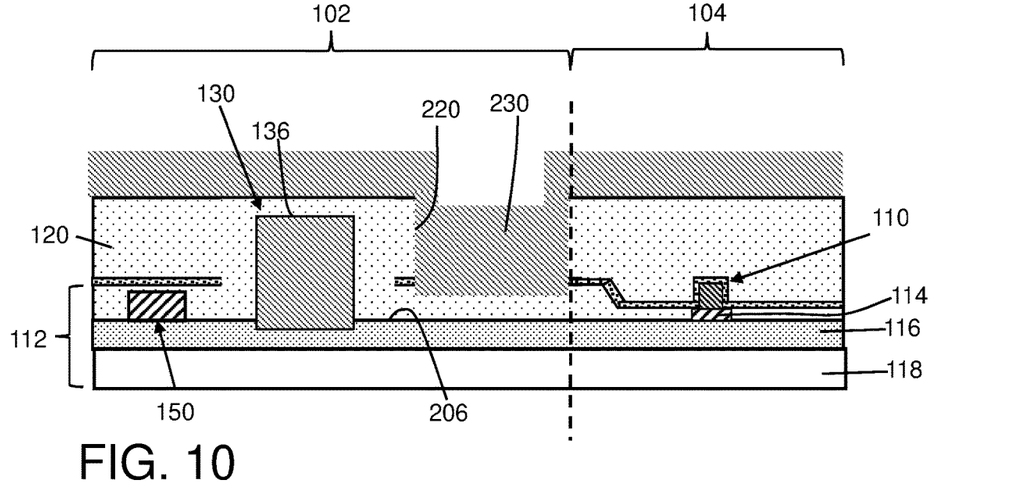
FIG. 10 shows a cross-sectional view of forming a second nitride layer for a second waveguide, according to embodiments of the disclosure.
Figure 11:
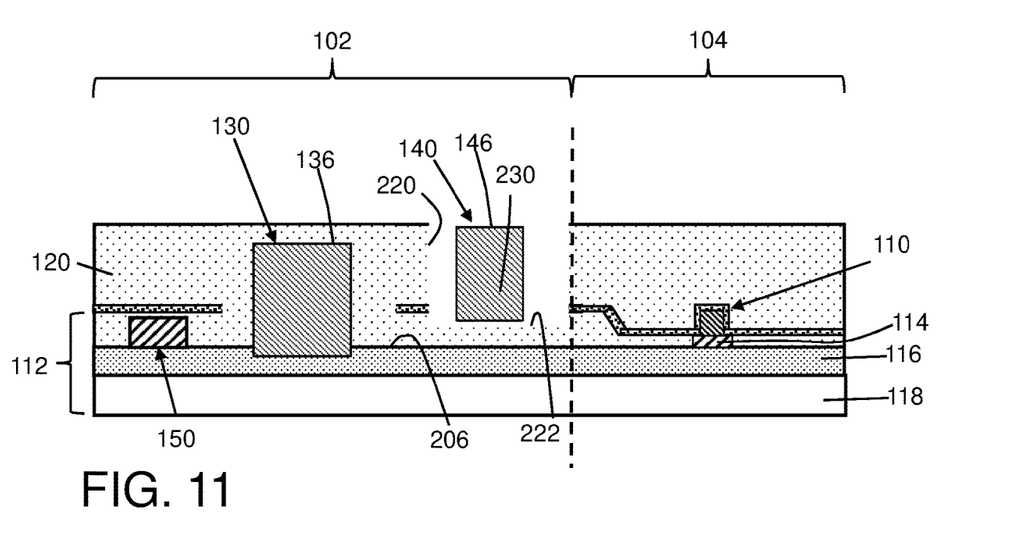
FIG. 11 shows a cross-sectional view of patterning a second nitride layer for a second waveguide, according to embodiments of the disclosure.

FIGS. 9-11 show cross-sectional views of forming a second waveguide 140 by: forming a trench 220 through ILD layer 120 in first region 102 of SOI substrate 112. Trench 220 may be formed similarly to trench 210 (FIG. 5). However, a lower surface 222 of second trench 220 is above buried insulator layer 116, i.e., trench 220 does not extend as far into ILD layer 120 as trench 210, nor does it extend into upper portion 206 of buried insulator layer 116. Trench 220 may optionally have a portion having a laterally tapered shape to form tapered portion 160 (FIG. 2) for waveguide 140.

FIG. 10 shows forming a second nitride layer 230 within trench 220. Nitride of nitride layer 230 may be deposited using any appropriate technique, and multiple deposition steps may be performed.

FIG. 11 shows an optional lithography and etching of second nitride layer 230, i.e., to shape it to desired dimensions. The etching may include, for example, a RIE.

Returning to FIG. 1, the figure shows processing after refilling ILD layer 120, thus forming second waveguide 140. The refilling may include, for example, gap filling about second nitride layer 230 (FIG. 11) (e.g., with a gap fill oxide), planarizing upper surface 146 of second nitride layer 230 (FIG. 11), and forming a topping layer(s) of ILD layer 120 over second nitride layer 230 (and first waveguide 130).

Depending on whether the planarizing reaches upper surface 136 of first waveguide 130, upper surfaces 136, 146 of first and second waveguides 130, 140 may be coplanar (FIG. 1), but they may be non-coplanar (FIG. 11). Upper surfaces 136, 146 of first and second waveguides 130, 140 are within ILD layer(s) 120. FIG. 1 also shows first nitride layer 214 (FIG. 8) (now as first waveguide 130) has a larger vertical dimension, i.e., thickness T1, than second nitride layer 230 (FIG. 11) (now as second waveguide 140). As noted, first and second waveguides 130, 140 are optically side-coupled.

At this stage, interconnects 122 may be formed in ILD 120, and any back-end-of-line interconnect layers 124 and related interconnects can be formed using known techniques.

FIGS. 12-15 show cross-sectional views of forming first and second waveguides 130, 140 generally together, e.g., using a single nitride layer.

Figure 12:
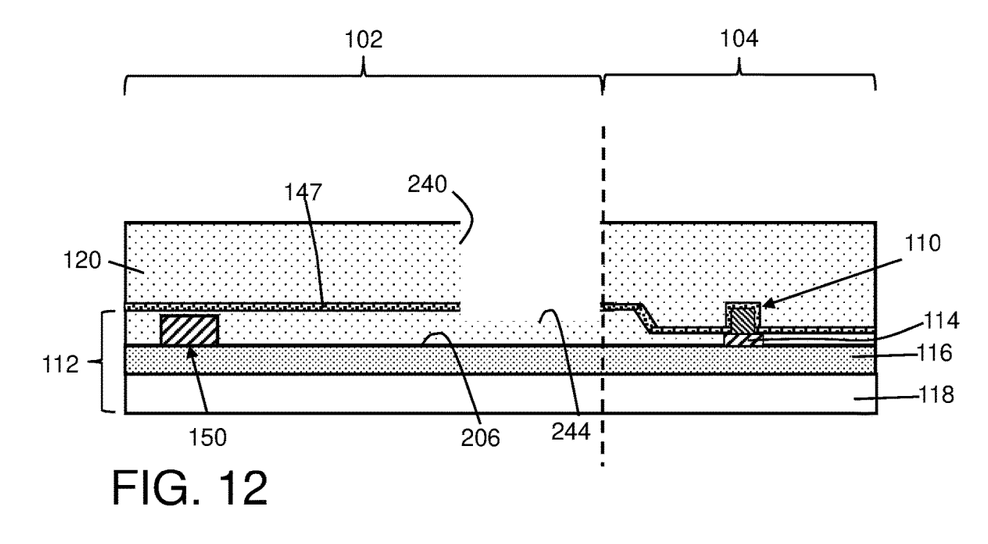
FIG. 12 shows a cross-sectional view of forming a trench for a waveguide, according to embodiments of the disclosure.
Figure 13:
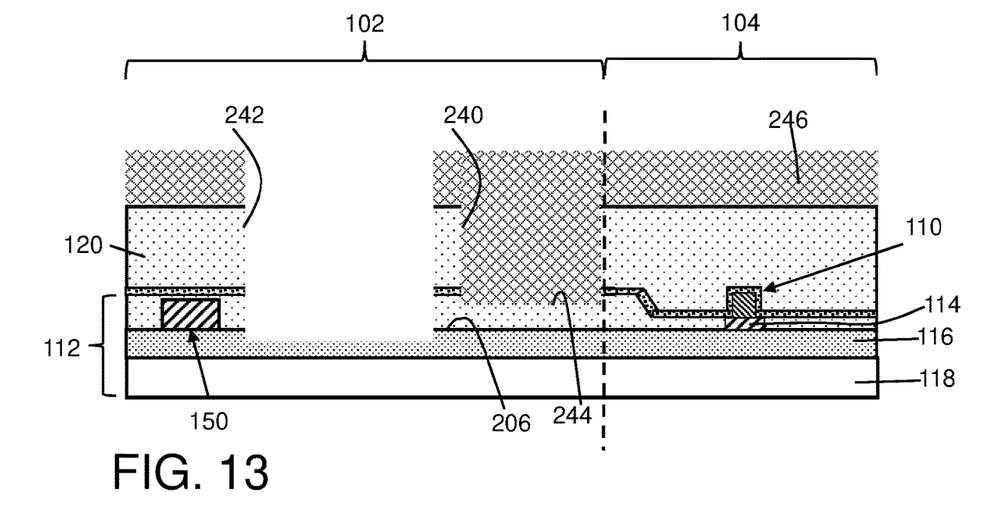
FIG. 13 shows a cross-sectional view of forming another trench for another waveguide, according to embodiments of the disclosure.

Starting from preliminary structure 200 shown in FIG. 4, FIG. 12 shows forming a trench 240 through ILD layer 120 in first region 102 of SOI substrate 112 under ILD layer 120, and FIG. 13 shows forming a trench 242 through ILD layer 120 in first region 102 of SOI substrate 112 under ILD layer 120. As shown in FIG. 12, trench 240 may be formed similarly to trench 220 (FIG. 9). Here, a lower surface 244 of trench 240 is above buried insulator layer 116, i.e., trench 240 does not extend as far into ILD layer 120 as trench 242 (FIG. 13), nor does it extend into upper portion 206 of buried insulator layer 116. Trench 240 may stop on nitride cap 147, or may extend through it. Trench 240 may have any desired dimensions, as described previously herein relative to trench 220 (FIG. 9). Notably, where desired, trench 240 may have a portion having a laterally tapered shape to form tapered portion 160 (FIG. 2) for second waveguide 140.

As shown in FIG. 13, a spin-on-hardmask (SOH) or organic planarization layer (OPL) 246 may fill trench 240, protecting trench 240 during formation of trench 242. SOH or OPL layer 246 can be patterned and etched to form trench 242. Trench 242 extends at least partially into upper portion 206 of buried insulator layer 116 of SOI substrate 112. In one non-limiting example, trench 242 may extend into buried insulator layer 0.02-0.5 micrometers (μm) for a 2 μm thick buried insulator layer 116. Trench 242 formation, e.g., etching, may also remove nitride cap 147. Trench 242 may be formed using any now known or later developed opening techniques, as described herein. Trench 242 may have any desired dimensions, as described herein relative to trench 210 (FIG. 5). Notably, where desired, trench 242 may have a portion having a laterally tapered shape to form tapered portion 160 (FIG. 2) for first waveguide 130. While shown with trench 240 formed first, it will be recognized that either trench 240, 242 may be formed first and the other trench filled with spin-on-hardmask (SOH) or organic planarization layer (OPL) 246 for formation of the other trench. In any event, after the final trench formation, SOH or OPL layer 246 can be removed, e.g., using an ashing process.

Figure 14:
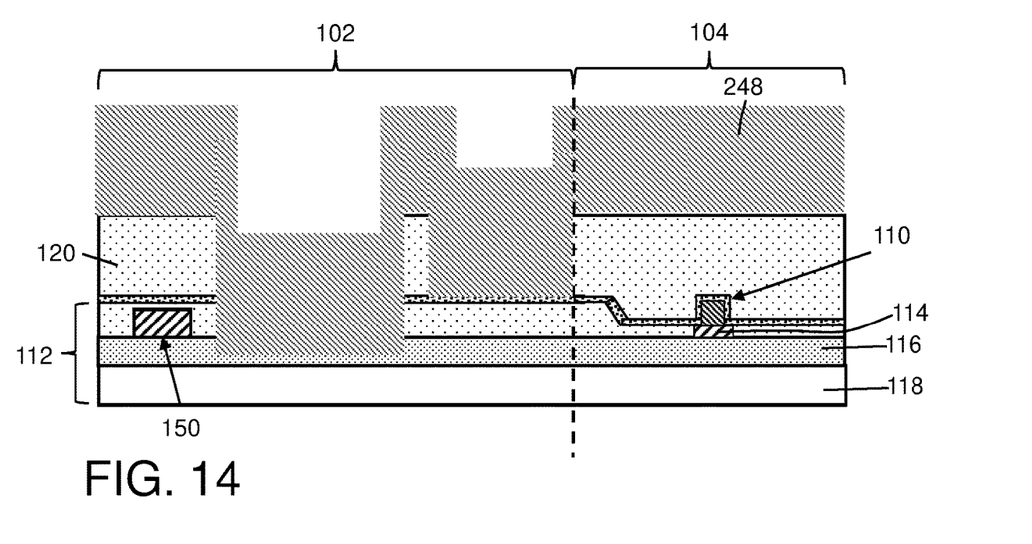
FIG. 14 shows a cross-sectional view of forming a single nitride layer in two trenches for a pair of waveguides, according to embodiments of the disclosure.

FIG. 14 shows forming a nitride layer 248 within both trenches 240 and 242. Nitride may be deposited using any appropriate technique, and multiple deposition steps may be performed. Since both trenches 240, 242 are previously formed, what were formed as first and second nitride layers 214, 230 (FIGS. 7, 11) are formed together as singe nitride layer 248.

Figure 15:
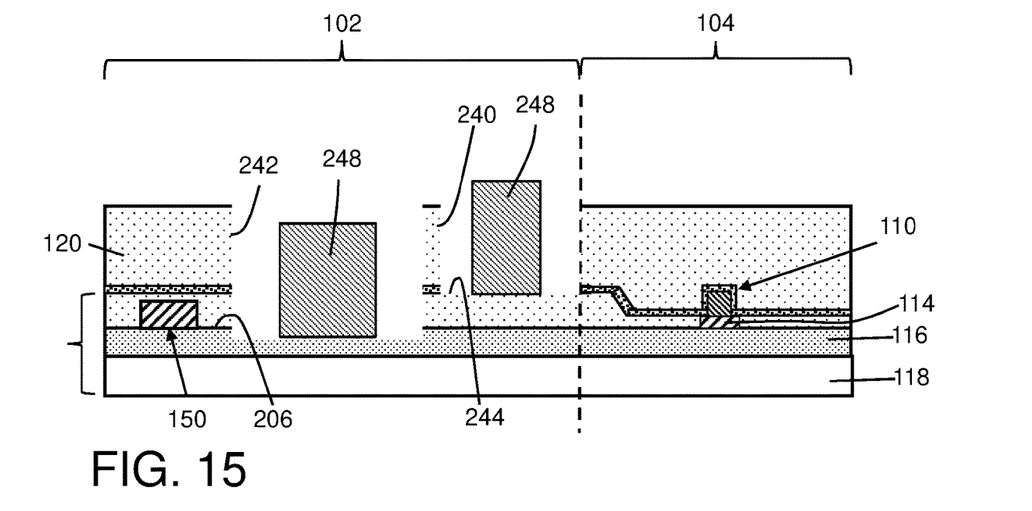
FIG. 15 shows a cross-sectional view of patterning a single nitride layer for a pair of waveguides, according to embodiments of the disclosure.

FIG. 15 shows an optional lithography and etching of nitride layer 248, i.e., to shape it to desired dimensions. The etching may include, for example, a RIE.

Returning to FIG. 1, the figure shows processing after refilling ILD layer 120, thus forming both first and second waveguides 130, 140. The refilling may include, for example, gap filling (e.g., with a gap fill oxide) about nitride layers 248 (FIG. 15). The gap fill oxide may become part of ILD layer 120 and/or additional topping layer(s) of ILD layer 120 may be formed over nitride layers 248 and the gap fill oxide. In any event, an upper surface of ILD layer(s) 120 (FIG. 1) is planarized, e.g., using chemical mechanical polishing (CMP). After the gap filling, but prior to the formation of additional topping layer(s) of ILD 120 and planarizing thereof, a planarizing can make upper surfaces 136, 146 of first and second waveguides 130, 140 coplanar (FIG. 1). Alternatively, the planarization may not extend far enough to make upper surfaces 136, 146 of first and second waveguides 130, 140 planar (FIG. 1), and they may remain non-coplanar (FIG. 15). In any event, upper surfaces 136, 146 of first and second waveguides 130, 140 are within ILD layer(s) 120. FIG. 1 also shows nitride layer 248 (FIG. 15), now as first waveguide 130, has a larger vertical dimension, i.e., thickness T1, than nitride layer 248 (FIG. 15), now as second waveguide 140. As noted, first and second waveguides 130, 140 are optically side-coupled.

At this stage, interconnects 122 may be formed in ILD 120, and any back-end-of-line interconnect layers 124 can be formed using known techniques.

As noted, embodiments of the disclosure provide structures and methods having an enlarged waveguide 130, compared to conventionally sized silicon or nitride waveguides, e.g., less than approximately 300 nanometers. The enlarged waveguide 130 includes lower surface 132 extending at least partially into buried insulator layer 116, which allows vertical enlargement of the waveguide (e.g., approximately 0.5-1.0 micrometers (μm)), without increasing the thickness of ILD layer 120 or increasing the length of interconnects 122 to other devices. As described, the enlarged waveguide 130 may include nitride, but can be easily implemented with other conventional silicon and nitride waveguides. The enlarged waveguide 130 improves propagation losses, and allows vertical optical coupling between conventional silicon waveguides 150 (e.g., in silicon layers) and other conventionally sized nitride waveguides 140. Since the enlarged waveguide 130 does not also increase the thickness of ILD layer 120, no changes that would negatively impact contact resistance are required to middle-of-line interconnects (e.g., to CMOS devices) or back-end-of-line interconnects (e.g., above CMOS devices) in ILD layer 120. The enlarged waveguide 130 also enables silicon-to-nitride waveguide (130 with 150) optical side-coupling that was not previously possible, while also maintaining nitride-to-nitride waveguide (130 with 140) optical side-coupling. Hence, the waveguide 130 enables monolithic integration of ultra-low-loss, large-size nitride waveguides with silicon waveguides 150 and CMOS devices 110, allowing full realization of the benefit of ultra-low-loss nitride devices and photonic integrated circuits. The enlarged waveguide 130 is also less sensitive to fabrication variations than existing nitride waveguides, and can handle higher optical power.

The method as described above is used in the fabrication of photonic integrated circuit chips. The resulting photonic integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure, comprising:
   a semiconductor-on-insulator (SOI) substrate including a semiconductor-on-insulator (SOI) layer over a buried insulator layer over a semiconductor substrate;
   an inter-level dielectric (ILD) layer over the SOI substrate;
   a nitride cap in the ILD layer; and
   a first waveguide positioned in the ILD layer in a first region of the SOI substrate, the first waveguide including a lower surface extending at least partially into the buried insulator layer and an upper surface above the buried insulator layer and the nitride cap.

2. The structure of claim 1, further comprising a complementary metal-oxide semiconductor (CMOS) device in a second region of the SOI substrate, wherein the ILD layer is over the CMOS device and includes interconnects to the CMOS device.

3. The structure of claim 1, further comprising a second waveguide in the ILD layer in the first region of the SOI substrate, the second waveguide including a lower surface above the buried insulator layer, and wherein the first and second waveguide are optically side-coupled to one another.

4. The structure of claim 3, wherein the first waveguide and the second waveguide have upper surfaces that are coplanar.

5. The structure of claim 3, wherein the first waveguide has a larger thickness than the second waveguide.

6. The structure of claim 3, further comprising a third waveguide in the ILD layer in the first region of the SOI substrate, and wherein the first and third waveguides are optically side-coupled.

7. The structure of claim 6, wherein the first waveguide and the second waveguide include a different material than the third waveguide.

8. The structure of claim 7, wherein the first and second waveguide include a nitride material, and the third waveguide includes a silicon material.

9. The structure of claim 6, wherein at least one of the first, second and third waveguides includes a portion having a laterally tapering dimension.

10. A photonic integrated circuit (PIC), the comprising:
    a semiconductor-on-insulator (SOI) substrate including a semiconductor-on-insulator (SOI) layer over a buried insulator layer over a semiconductor substrate;
    an inter-level dielectric (ILD) layer over the SOI substrate;
    a nitride cap in the ILD layer;
    a first waveguide positioned in the ILD layer in a first region of the SOI substrate, the first waveguide having a lower surface extending at least partially into the buried insulator layer and an upper surface above the buried insulator layer and the nitride cap; and
    a second waveguide in the ILD layer in the first region of the SOI substrate, the second waveguide including a lower surface above the buried insulator layer,
    wherein the first and second waveguide are optically side-coupled, and
    wherein the first waveguide has a larger thickness than the second waveguide.

11. The PIC of claim 10, further comprising a complementary metal-oxide semiconductor (CMOS) device in a second region of the SOI substrate, wherein the ILD layer is over the CMOS device and includes interconnects to the CMOS device.

12. The PIC of claim 10, wherein at least one of the first and second waveguides includes a portion having a laterally tapering dimension.

13. The PIC of claim 10, further comprising a third waveguide in the ILD layer in the first region of the SOI substrate, and wherein the first and third waveguides are optically side-coupled to one another.

14. The PIC of claim 13, wherein the first waveguide and the second waveguide include a different material than the third waveguide.

15. The PIC of claim 14, wherein the first and second waveguides include a nitride material, and the third waveguide includes a silicon material.

16. A method of forming a waveguide structure, the method comprising:
forming a first waveguide by:
forming a first trench through an inter-level dielectric (ILD) layer in a first region of a semiconductor-on-insulator (SOI) substrate under the ILD layer, the first trench extending into at least an upper portion of a buried insulator layer of the SOI substrate;
forming a first nitride layer within the first trench; and
planarizing an upper surface of the first nitride layer, wherein the upper surface of the first nitride layer remains within the ILD layer.

17. The method of claim 16, further comprising forming a complementary metal-oxide semiconductor (CMOS) device in a semiconductor-on-insulator (SOI) layer of the SOI substrate in a second region of the SOI substrate, wherein the ILD layer is part of a middle-of-line layer including interconnects to the CMOS device.

18. The method of claim 16, further comprising forming a second waveguide by:
forming a second trench through the ILD layer in the first region of the SOI substrate, a lower surface of the second trench being above the buried insulator layer;
forming a second nitride layer within the second trench; and
planarizing an upper surface of the second nitride layer, wherein the upper surface of the second nitride layer remains within the ILD layer,
wherein the first nitride layer has a larger vertical dimension than the second nitride layer,
wherein the first and second waveguides are optically side-coupled.

19. The method of claim 18, wherein the first and second trenches are formed prior to the forming of the first and second nitride layers, the first and second nitride layers are formed as a single nitride layer.

20. The method of claim 16, further comprising, prior to forming the first trench, forming a third waveguide by:
forming a third trench in the ILD layer in the first region of the SOI substrate, a lower surface of the third trench being above the upper portion of the buried insulator layer;
forming a silicon layer within the third trench; and
planarizing an upper surface of the silicon layer,
wherein the first and third waveguides are optically side-coupled.

\* \* \* \* \*